US006816610B1

(12) United States Patent
Beckwith

(10) Patent No.: US 6,816,610 B1
(45) Date of Patent: Nov. 9, 2004

(54) IMAGE PROCESSING SYSTEM

(75) Inventor: Timothy John Beckwith, Marlborough (GB)

(73) Assignee: Quantel, Ltd., Berkshire (GB)

( * ) Notice: Subject to any disclaimer, the term of this patent is extended or adjusted under 35 U.S.C. 154(b) by 0 days.

(21) Appl. No.: 09/121,801

(22) Filed: Jul. 23, 1998

(30) Foreign Application Priority Data

Aug. 14, 1997 (GB) .............................................. 9717285

(51) Int. Cl.[7] .............................................. G06K 9/00
(52) U.S. Cl. ........................ 382/162; 382/274; 358/520
(58) Field of Search ................................ 348/649, 687, 348/650, 688, 652, 659, 661, 609, 645, 642, 631, 671, 674, 666, 254, 256; 382/167–169, 284, 254, 162, 274; 358/1.9, 515–523, 531; 345/633, 597–604, 589–591

(56) References Cited

U.S. PATENT DOCUMENTS 4,829,455 A  5/1989  Long et al. .................. 345/632
5,786,871 A  * 7/1998 Penney ........................ 348/609
6,075,889 A  * 6/2000 Hamilton, Jr. et al. ....... 382/167

FOREIGN PATENT DOCUMENTS

EP          0245943       11/1987      ........... G06F/15/72
GB          2 328 336     *  8/1997      ............ H04N/9/64

* cited by examiner

Primary Examiner—Leo Boudreau
Assistant Examiner—Ishrat Sherali
(74) Attorney, Agent, or Firm—Cooper & Dunham LLP

(57) ABSTRACT

An image processing system is arranged to convert data representing a picture element with an original color defined in terms of original brightness and hue values into data representing the picture element with a new color, different than the original color. In the system a new hue value is calculated from the original hue value by way of a transforming circuit 5. The original and new hue values are both processed in look up tables 4, 6 to determine respective inherent brightness values associated therewith. The original brightness value is processed with the inherent brightness values by way of a subtracter 7 and an adder 8 to produce a new brightness value that together with the new hue value defines the new color of the pixel.

33 Claims, 1 Drawing Sheet

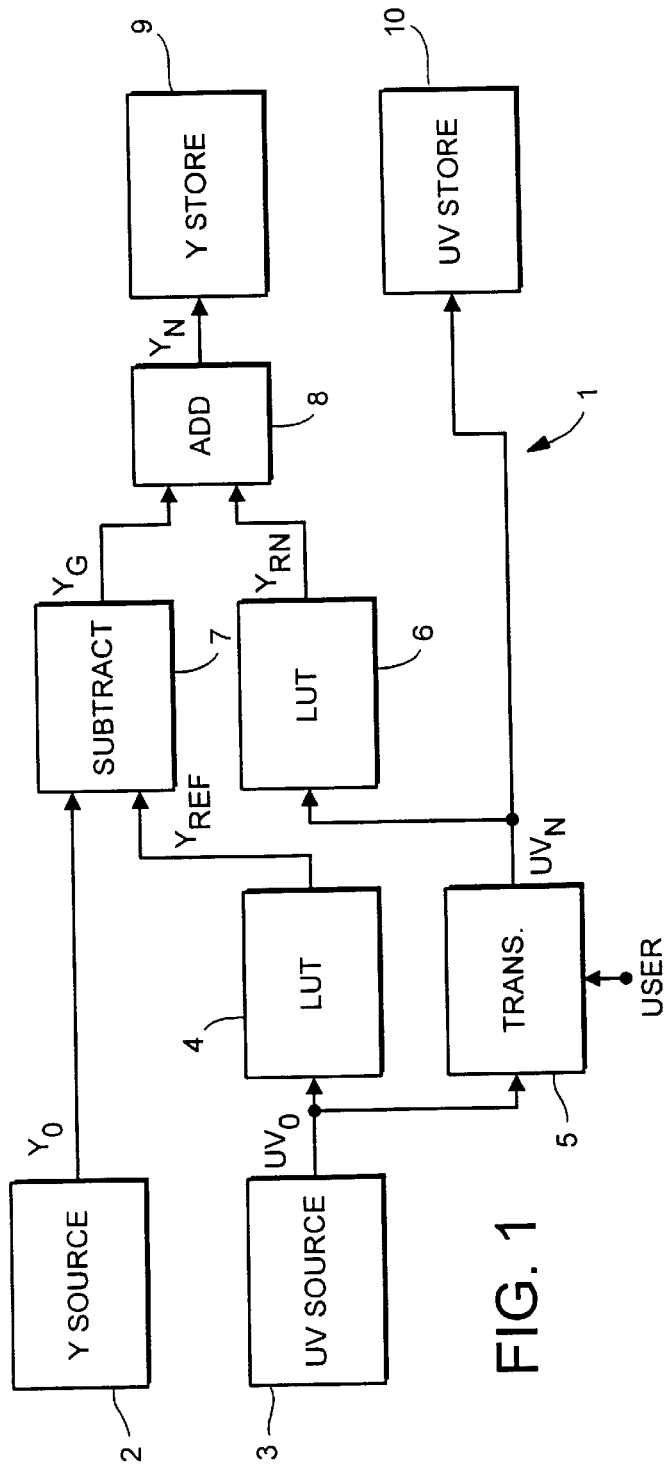
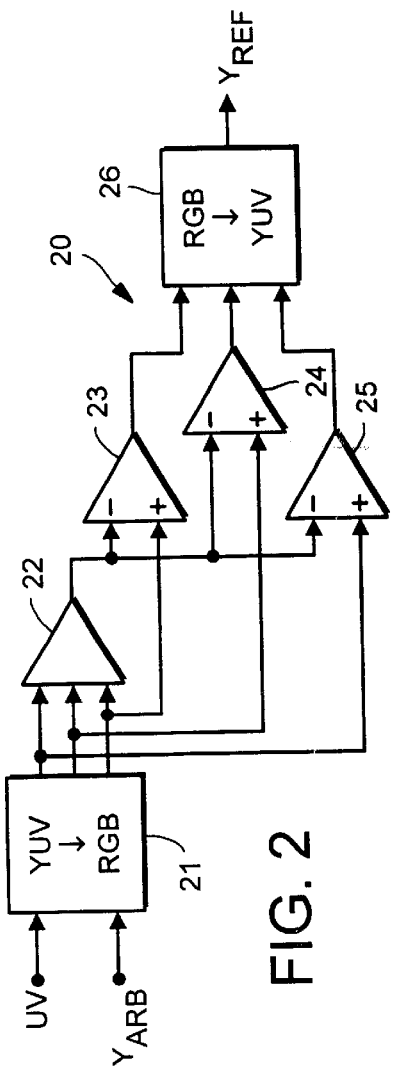
FIG. 1
FIG. 2

IMAGE PROCESSING SYSTEM

BACKGROUN OF THE INVENTION

The invention relates to an image processing system.

Image processing systems are used to effect changes to images by processing data that represents the image for example as a multiplicity of pixels that together form the image. Such changes include adjusting the color of an image for any one or more of a variety of reasons including correcting skin tones, varying overall brightness (e.g., changing day to night) and changing from one color to another.

The representation of color is a complex issue because the perception of color depends on many factors including the light available to light a scene, the sensitivity of the eye to different colors and psychological effects such as mood and atmosphere. The eye is sensitive to both brightness and hues, i.e., the amount of light and the appearance of the color (redness, orangeness, yellowness, etc.). That is, any color can be represented by a single hue plus a given amount of white (or "greyness"). Since white is a combination of all colors, it follows that a single color can be represented by a single hue plus a given amount of all visible color.

Several different data formats are used in electronic environments to represent color in an image. In television-type systems (and this includes systems capable of handling broadcast-quality pictures up to systems capable of handling print-quality pictures) images are commonly represented by data defining each picture element in terms of a brightness component and color component. The brightness component is commonly referred to as the "luminance" and represents the greyness of each picture element. The color component is commonly referred to as the "chrominance" and represents the hue (i.e., whether the color is red, green, orange, yellow, etc.) and saturation (i.e., the relative amount of hue) of each picture element. Black, grey and white have no chrominance, only luminance, but any color has both chrominance and luminance. The chrominance information is commonly defined in terms of color difference signals with respect to luminance Y, namely R-Y and B-Y, where R=red, B=blue. Since Y=R+G+B, where G=green, and any color may be defined in terms of its red, green and blue components, it follows that any color may be defined by the three signals Y, (R-Y) and (B-Y). These three signals are also referred to as YUV and YIQ signals (although strictly speaking these references are only correct in respect of certain elements of a television signal) and Y Cr Cb which are the digital equivalents of the analogue Y, (R-Y) and (B-Y) signals.

Perception of color is relative and is also dependent on the eye's sensitivity to different wavelengths of light. In virtually any captured image the color will not be a true representation of the color in the original scene. This is because the means by which the image is captured may not have a sufficient dynamic range to capture all color, may be incapable of representing certain color or simply may not represent certain color correctly. Normally, this is not a problem because the mind perceives color relative to each other and, as long as a reference color such as skin tone appears correct, usually the color will appear relatively correct.

There are, however, situations where a problem may remain. For example, in color photography certain flowers appear to be pink instead of blue although every other color in the image appears satisfactory, because some blue flowers reflect both blue light and infrared light and while the eye is not sensitive to infrared light some color films are.

One way of correcting a problem such as this would be selectively to adjust the chrominance values so that the color in the flower are changed from the incorrect range of pinks (the source color space) to the "correct", i.e. acceptable, range of blues (the target color space). However, simply adjusting the chrominance to that of the target colour space may result in those colors appearing too light to too dark. This is because every colour can also be regarded as one or more light components of given wavelengths within the visible spectrum, and the eye is not uniformly sensitive to the different wavelengths of light across the spectrum. In fact the eye is most sensitive to greens which correspond to wavelengths in the middle of the visible spectrum and is less sensitive to reds and blues corresponding to wavelengths at the ends of the visible spectrum. If the color in a picture of a pink flower is changed to blue it may be necessary to reduce the luminance values as well as the chrominance values so that the blue does not appear too bright. However, simply reducing the luminance can cause other problems because the luminance contains the most information about details in an image. For example, highlights or reflections in an image are almost entirely luminance and very little chrominance. Thus, reducing the luminance will reduce the highlights leading to a loss in detail in the image. Also, reducing the luminance will reduce the brightness in other colours making them appear too dark.

A more extreme example would be changing yellows in a picture into blues or vice versa. Yellow is nearer the middle of the visible spectrum than is blue and, because of the eyes greater sensitivity in the middle of the spectrum, yellow is therefore a brighter color (higher luminance values) than blue. Simply mapping yellow onto blue by changing the chrominance values will result in a blue that is too bright and in extreme examples appears luminous. Again, reducing the values of the luminance data will make other colors in the picture appear too dark.

In image processing a stencil or control image is commonly used to restrict processing of an image to a specified area of interest, for example the portion of the image containing the pink flower. This approach is acceptable but it does not overcome the problem of loss of detail when luminance values are reduced.

Clearly, therefore, there is a need for an image processing system that is able to change colors in an image so that all colors appear relatively correct without reducing the detail in the colour-changed areas of the example.

SUMMARY OF THE INVENTION

The present invention aims to overcome the above discussed problems and meet the above-identified need.

According to one aspect of the invention there is provided an image processing apparatus comprising: a source of image data defining colors of a multiplicity of pixels which together form an initial color image, an initial color of each pixel of the initial color image being defined in terms of an initial brightness value and an initial hue value; a transforming circuit for transforming the initial hue value of a pixel to represent a new hue value; a deriving circuit for deriving brightness data representing inherent brightness values associated respectively with the initial and new hue values of a pixel; and a calculating circuit for calculating from the initial brightness value and the inherent brightness values associated with the initial and new hue values a new brightness value which together with the new hue value defines a new pixel colour value.

According to another aspect of the invention there is provided An image processing method comprising: supplying image data defining color of a multiplicity of pixels which together form an initial color image, an initial color of each pixel of the initial color image being defined in terms of an initial brightness value and an initial hue value; transforming the initial hue value of a pixel to represent a new hue value; deriving brightness data representing inherent brightness values associated respectively with the initial and new hue values of a pixel; and calculating from the initial brightness value and the inherent brightness values associated with the initial and new hue values a new brightness value which together with the new hue value defines a new pixel color value.

The invention also provides an image processing system for converting data representing a picture element with an original color, defined in terms of original brightness and hue values into data representing the picture element with a new colour, different than the original color; in which system a new hue value is calculated from the original hue value, the original and new hue values are both processed to determine respective inherent brightness values associated therewith, and the original brightness value is processed with the inherent brightness values to produce a new brightness value that together with the new hue value defines the new colour of the pixel.

The invention can be said to reside in the realisation that for any given value of chrominance (i.e., any combination of, for example, (R-Y) and (B-Y) or U, V OR Cr, Cb) there is a corresponding brightness value (i.e., luminance component) which is proportional to the eyes sensitivity to the given value. As will be explained in greater detail hereinafter, the brightness value for a given color can be calculated in advance and then used in a colour transformation to effect a color change operation to data representing an initial image to produce data representing a resultant image in which the color appear to be correct.

The above and further features of the invention are set forth with particularity in the appended claims and together with advantages thereof will become clearer from consideration of the following detailed description of an exemplary embodiment of the invention given with reference to the accompanying drawings.

BRIEF DESCRIPTION OF THE DRAWINGS

FIG. 1 shows a system embodying the invention; and

FIG. 2 shows a circuit for calculating values used in the system of FIG. 1.

DESCRIPTION OF THE PREFERRED EMBODIMENT

Turning now to FIG. 1, there is shown an image processing system 1 embodying the invention. The system 1 comprises a source 2 of luminance signals $Y_O$ and a source 3 of chrominance signals $UV_O$ which together represent an original or initial colour image. The image is only "original" in the sense that as far as the system 1 is concerned the signals in the sources 2, 3 originate from the sources 2, 3. Thus, the Y and UV signals may be supplied from another source outside the system 1 as shown. The sources 2, 3 may be any suitable source of digital YUV data including, for example, one or more sequential access stores, such as a video tape recorder, or random access stores such as a frame store. Although shown separately for the purpose of explanation the two stores 2, 3 may be combined in a single unit capable of supplying the $Y_O$ and $UV_O$ signals separately.

$UV_O$ data from the source 3 is input to a look up table 4. For any combination of U and V values there is a corresponding brightness value which is proportional to the sensitivity of the eye to that UV combination. The brightness value is calculated as a reference luminance value $Y_{REF}$. Thus, the look up table 4 contains for every UV combination a corresponding value of $Y_{REF}$. As with all look up tables, the values of $Y_{REF}$ in the look up table 4 are calculated and stored therein in advance.

FIG. 2 of the accompanying drawings shows a circuit 20 that may be used instead of the look up table 4 to calculate a value Of $Y_{REF}$ for each UV combination. Consideration of the circuit will also facilitate an understanding of how the values of $Y_{REF}$ may be calculated in advance where the look up table 4 is to be used in the system 1. The values Of $Y_{REF}$ are calculated individually for each combination of U and V by first associating with the UV combination an arbitrary luminance value $Y_{ARB}$. The data $Y_{ARB}$ UV is then converted into RGB data (red, green and blue colour components). In the circuit 20 this conversion is effected by way of a matrix 21 which may be of the kind described in our European Patent 245943 and corresponding U.S. Pat. No. 4,829,455 the teachings of which are incorporated herein.

Next, the whiteness of the color is subtracted from the RGB data by subtracting the minimum of the R, G and B values from each of the R, G and B values. In the circuit 20 this operation is effected by way of a comparator 22 and subtractors 23 to 25. The comparator 22 compares the RGB values with each other, identifies the lowest of the three and outputs the identified lowest value to the subtractors 23 to 25. The RGB data is also input respectively to the subtractors 23 to for subtraction therefrom of the value output from the comparator 20. This results in one of the R, G and B values being zero and the other two values being greater than zero. The outputs from the subtractors 23 to 25 are input to another matrix 26 which converts the RGB data into YUV data. Again, the matrix may be of the kind described in our European Patent 245943 and corresponding U.S. No. Pat. 4,829,455. Only the luminance value Y from the matrix is of interest because it corresponds to the value of $Y_{REF}$ required by the system 1.

The value of $Y_{ARB}$ may be arbitrary because its effect cancels out in the calculations. If the value $Y_{ARB}$ is too high, the resulting R. G and B values will also be too high but when the minimum is subtracted the effect of the high $Y_{ARB}$ value will also be subtracted and thus be cancelled out. Similarly, if $Y_{ARB}$ is too low the resulting R, G and B values will also be low (to the extent that one or more of the RGB values may even be negative) but when the minimum is subtracted less will be taken (or in the case of a negative minimum, subtraction of a negative will result in an addition to the values) so that the effect of a low $Y_{ARB}$ value will again be cancelled out.

Returning now to FIG. 1, the data $UV_O$ from the source 3 is also input to a color transforming circuit 5 which transforms the $UV_O$ data in UV space depending on user input control data input to the transforming circuit 5 by way of any suitable input device (not shown). The $UV_O$ data can be regarded as defining a vector identifying a particular chrominance value in chrominance (or UV) space. Conveniently therefore, the transforming circuit 5 applies a matrix transformation to the $UV_O$ vector so as to map it on to a new vector $UV_N$ in colour space. The original vector $UV_O$ may represent the chrominance for, say, yellow and the new vector $UV_N$ may represent the chrominance for, say, blue. (These colours are, of course, only referred to by way of example).

The new chrominance data $UV_N$ is input to a second look up table 6 which performs exactly the same function as the look up table 4. That is to say, the look up table 6 serves to output a reference luminance value $Y_{RN}$ which is the value of the luminance corresponding to the brightness of the input $UV_N$ combination. Since the look up table 6 is exactly the same as the look up table 4 it will be appreciated that the two look up tables can be replaced by a single look up table to which the source 3 and the transforming circuit 5 are selectively connected. The look up tables 4 and 6 are shown as separate units in the drawing simply to facilitate an understanding of the system 1.

Together the data $Y_O$ from the source 2, $Y_{REF}$ from the look up table 4 and $Y_{RN}$ from the look up table 6 contain sufficient information to enable a new luminance value $Y_N$ that is correct for the new chrominance value $UV_N$ to be calculated. First, the data $Y_O$ and $Y_{REF}$ is input to a subtractor 7 where an intermediate luminance value $Y_G$ is calculated from $Y_G = Y_O - Y_{REF}$. Since $Y_{REF}$ is the luminance associated with the chrominance value $UV_O$ it follows that $Y_G$ represents the greyness of the original picture. As has already been mentioned herein, the luminance data Y represents details in the image. Since the value $Y_{REF}$ is derived from the chrominance data $UV_O$, it follows that $Y_{REF}$ is a component of the luminance that does not contain information about the details in the image. Therefore, the intermediate or greyness luminance data $Y_G$ is the component of the luminance that does contain image detail information. This greyness data $Y_G$ must be carried over into the new picture because it represents the details in the image. Separating the greyness data $Y_G$ from the reference luminance data $Y_{REF}$ enables the greyness data $Y_G$ and hence the image details to be unaffected by any color transformations so that the detail therefore remains constant as between the original and the new picture.

$Y_G$ is added to the new reference luminance value $Y_{RN}$ from the look up table by way of an adder 8 to produce new luminance data $Y_N$. The new luminance data $Y_N$ from the adder is stored in a luminance store 9 and the new chrominance data $UV_N$ from the transforming circuit 5 is stored in a chrominance store 10. Although shown as separate entities, the two stores 9, 10 may be a single storing unit capable of storing Y and UV data separately. Indeed the stores 9, 10 may simply be the sources 2, 3 from which the data $Y_O$ and the $UV_O$ was originally supplied. The new data $Y_N$ and $UV_N$ may be stored alongside the original data $Y_O$ and $UV_O$ or it may replace it.

The effect that the system 1 has on a color represented by the data may be better understood by way of example. Assume that the data $Y_O$ and $UV_O$ together represents a yellow pixel. The $UV_O$ data represents a UV chrominance combination that corresponds to a yellow hue. There is an inherent brightness associated with that yellow which is determined by the look up table 5 as $Y_{REF}$. The difference between the brightness in the original yellow and the inherent brightness of the yellow hue is calculated by the subtractor 7 and represented by the luminance $Y_G$ output therefrom. The value $Y_G$ represents the brightness or greyness of the pixel independent of the inherent brightness of the yellow hue. That is, $Y_G$ is the brightness of the pixel from which the yellow colour brightness has been removed.

The transforming circuit 5 converts the original $UV_O$ data representing the chrominance of the original yellow pixel into new chrominance data $UV_N$ representing the chrominance of the new pixel color say blue. That is, the transforming circuit 5 changes the data to a UV chrominance combination that corresponds to a blue hue. There is an inherent brightness associated with that blue which is determined by the look up table 6 as $Y_{RN}$. The inherent brightness of the blue ($Y_{RN}$) will be less than that of the yellow ($Y_{REF}$) because of the way colors are perceived by the eye. The inherent brightness of the blue must nevertheless be added to the greyness (i.e. the colour-independent brightness) of the pixel ($Y_G$) in order to obtain the correct brightness in the new pixel colour. The addition is performed by the adder 8 to give a new brightness value $Y_N$ for use with the new hue value $UV_N$. Together the data $Y_N$ and $UV_N$ define a blue pixel which is seen to be at the correct brightness for the hue in relation to the colour of other pixels in the image.

Thus, the system 1 is able to transform a pixel from one color to another and at the same time correct for differences in the brightness between the two color. The system thus facilitates realistic color transformations.

An advantage of using the above described approach of converting from one colour to another is that it facilitates avoidance of the generation of "illegal" color, the YUV format is widely used in broadcast television. For various reasons only a certain range of YUV combinations are allowed to be transmitted in television signals. YUV combinations outside the range are said to be "illegal". For example, simply converting yellow to blue by changing the UV values to represent a blue hue instead of a yellow hue and making no change to the Y value may result in an illegal YUV combination because the Y value is too large for the UV values. Correcting the Y value to correspond to the new blue UV values will in most if not all cases produce legal YUV combinations. The look up tables 4 and 6 may be suitably defined to ensure that no illegal YUV values are defined.

It is also possible to define a color which is legal in one colour space but illegal to another. For example, converting from blue to yellow in YUV space simply by changing the UV data to that for a yellow hue will result in YUV data defining a dark or "dirty" yellow, which may, nevertheless; be legal in YUV space. It may, however, only be possible to represent the dirty yellow in RGB space by setting one of the red, green and blue components to a negative value. Mathematically this is acceptable, but there is no such thing as a negative colour in RGB space. An RGB combination with a negative value would therefore be illegal. Since the look up tables 4, 6 contain data calculated by converting from YUV to RGB and back to YUV, the luminance data from the look up tables will inherently correspond to legal RGB values. Correcting in YUV space as described above, before converting into RGB space therefore avoids the problem of generating illegal values in RGB space.

The present application is based on United Kingdom Patent application No. 717285.2 filed on Aug. 14, 1997, the entire contents of which are hereby incorporated by reference.

Having thus described the present invention by reference to a preferred embodiment it is to be well understood that the embodiment in question is exemplary only and that modifications and variations such as will occur to those possessed of appropriate knowledge and skills may be made without departure from the spirit and scope of the invention as set forth in the appended claims and equivalents thereof.

What is claimed is:

1. An image processing apparatus comprising:
 a source of image data defining colors of a multiplicity of pixels which together form an initial color image, an initial color of each pixel of the initial color image being defined in terms of an initial brightness value and an initial hue value;

a transforming circuit for transforming the, initial hue value of a pixel to represent a new hue value;

a deriving circuit for deriving brightness data representing inherent brightness values associated respectively with the initial and new hue values of a pixel the inherent brightness of the hue being the brightness remaining once all whiteness has been subtracted from a signal representing the hue; and a calculating circuit for calculating from the initial brightness value and the inherent brightness values associated with the initial and new hue values a new brightness value which together with the new hue value defines a new pixel color value.

2. An image processing apparatus as claimed in claim 1, wherein the transforming circuit comprises an input for receiving user determined data defining the transformation to be effected to the data defining the initial hue value to produce the data defining the new hue value.

3. An image processing apparatus as claimed in claim 1, wherein the deriving circuit comprises one or more look up tables containing data defining a predetermined relationship between hue values and inherent brightness values.

4. An image processing apparatus as claimed in claim 3, wherein the deriving circuit comprises a respective look up table for each of the initial and new inherent brightness values.

5. An image processing apparatus as claimed in claim 1, wherein the calculating circuit comprises a subtracter for subtracting the initial inherent brightness value from the initial brightness value to give a brightness value associated with the image.

6. An image processing apparatus as claimed in claim 5, wherein the calculating circuit comprises an adder for adding the new inherent brightness value to the brightness value associated with the image to give the new brightness value.

7. An image processing apparatus as claimed in claim 6, further comprising a store for storing the new brightness and hue values, the store containing a multiplicity of storage locations for storing data defining a multiplicity of pixels that together form a new color image.

8. An image processing apparatus as claimed in claim 7, wherein the source comprises the store.

9. An image processing method comprising:

supplying image data defining colors of a multiplicity of pixels which together form an initial color image, an initial color of each pixel of the initial color image being defined in terms of an initial brightness value and an initial hue value;

transforming the initial hue value of a pixel to represent a new hue value;

deriving brightness data representing inherent brightness values associated respectively with the initial and new hue values of a pixel the inherent brightness of the hue being the brightness remaining once all whiteness has been subtracted from a signal representing the hue; and calculating from the initial brightness value and the inherent brightness values associated with the initial and new hue values a new brightness value which together with the new hue value defines a new pixel color value.

10. An image processing method as claimed in claim 9, wherein the calculation of the new brightness value comprises subtracting the initial inherent brightness value from the initial brightness value to give a brightness value associated with the image.

11. An image processing method as claimed in claim 10, wherein the calculation of the new brightness value comprises adding the new inherent brightness value to the brightness value associated with the image to give the new brightness value.

12. An image processing method as claimed in any claim 9, further comprising storing the new brightness and hue values, together with a multiplicity of similarly processed data defining a multiplicity of pixels that together form a new color image.

13. An image processing system for converting data representing a picture element with an original color defined in terms of original brightness and hue values into data representing the picture element with a new color, different than the original color, in which system a new hue value is calculated from the original hue value, the original and new hue values are both processed to determine respective inherent brightness values associated therewith the inherent brightness of the hue being the brightness remaining once all whiteness has been subtracted from a signal representing the hue, and the original brightness value is processed with the inherent brightness values to produce a new brightness value that together with the new hue value defines the new color of the pixel.

14. An image processing system as claimed in claim 13, wherein the new hue value is calculated depending on user determined input data.

15. An image processing system as claimed in claim 13, wherein the inherent brightness values for each of the original and new hue values are determined by inputting the hue values to one or more look up tables.

16. An image processing system as claimed in claim 15, wherein the inherent brightness values are determined by inputting the original and new hue values to respective look up tables.

17. An image processing system as claimed in claim 13, wherein the original brightness value is processed with the inherent brightness values by subtracting the inherent brightness value associated with the original hue therefrom and then adding the inherent brightness value associated with the new hue thereto.

18. An image processing system as claimed in claim 13, wherein the original data is supplied from and the new data is stored in a store.

19. An image processing apparatus as claimed in claim 2, wherein the deriving circuit comprises one or more look up tables containing data defining a predetermined relationship between hue values and inherent brightness values.

20. An image processing apparatus as claimed in claim 19, wherein the deriving circuit comprises a respective look up table for each of the initial and new inherent brightness values.

21. An image processing apparatus as claimed in claim 2, wherein the calculating circuit comprises a subtracter for subtracting the initial inherent brightness value from the initial brightness value to give a brightness value associated with the image.

22. An image processing apparatus as claimed in claim 3, wherein the calculating circuit comprises a subtracter for subtracting the initial inherent brightness value from the initial brightness value to give a brightness value associated with the image.

23. An image processing apparatus as claimed in claim 4, wherein the calculating circuit comprises a subtracter for subtracting the initial inherent brightness value from the initial brightness value to give a brightness value associated with the image.

24. An image processing apparatus as claimed in claim 19, wherein the calculating circuit comprises a subtracter for subtracting the initial inherent brightness value from the initial brightness value to give a brightness value associated with the image.

25. An image processing method as claimed in claim 10, further comprising storing the new brightness and hue values, together with a multiplicity of similarly processed data defining a multiplicity of pixels that together form a new color image.

26. An image processing method as claimed in claim 11, further comprising storing the new brightness and hue values, together with a multiplicity of similarly processed data defining a multiplicity of pixels that together form a new color image.

27. An image processing system as claimed in claim 14, wherein the inherent brightness values for each of the original and new hue values are determined by inputting the hue values to one or more look up tables.

28. An image processing system as claimed in claim 27, wherein the inherent brightness values are determined by inputting the original and new hue values to respective look up tables.

29. An image processing system as claimed in claim 14, wherein the original brightness value is processed with the inherent brightness values by subtracting the inherent brightness value associated with the original hue therefrom and then adding the inherent brightness value associated with the new hue thereto.

30. An image processing system as claimed in claim 27, wherein the original brightness value is processed with the inherent brightness values by subtracting the inherent brightness value associated with the original hue therefrom and then adding the inherent brightness value associated with the new hue thereto.

31. An image processing system as claimed in claim 28, wherein the original brightness value is processed with the inherent brightness values by subtracting the inherent brightness value associated with the original hue therefrom and then adding the inherent brightness value associated with the new hue thereto.

32. An image processing system as claimed in claim 15, wherein the original brightness value is processed with the inherent brightness values by subtracting the inherent brightness value associated with the original hue therefrom and then adding the inherent brightness value associated with the new hue thereto.

33. An image processing system as claimed in claim 16, wherein the original brightness value is processed with the inherent brightness values by subtracting the inherent brightness value associated with the original hue therefrom and then adding the inherent brightness value associated with the new hue thereto.

* * * * *